United States Patent
Lokietek et al.

(10) Patent No.: US 6,841,039 B1
(45) Date of Patent: Jan. 11, 2005

(54) COMPOSITION AND METHOD FOR THE PRODUCTION OF PLANAR STRUCTURES, ESPECIALLY STRUCTURES MADE OF PAPER OR CARDBOARD

(75) Inventors: Bruno Lokietek, Mazingarbe (FR); Pierre Lefer, Merville (FR); Marcel Dondeyne, Hinges (FR); Régis Merle Du Bourg, La Madeleine (FR); Marika Ladret, Lompret (FR)

(73) Assignee: Roquette Freres, Lestrem (FR)

( * ) Notice: Subject to any disclaimer, the term of this patent is extended or adjusted under 35 U.S.C. 154(b) by 0 days.

(21) Appl. No.: 10/009,007

(22) PCT Filed: May 31, 2000

(86) PCT No.: PCT/FR00/01504

§ 371 (c)(1),
(2), (4) Date: Dec. 3, 2001

(87) PCT Pub. No.: WO00/75425

PCT Pub. Date: Dec. 14, 2000

(30) Foreign Application Priority Data

Jun. 4, 1999 (FR) .............................. 99 07086

(51) Int. Cl.$^7$ ......................... D21H 11/00; D21H 13/00
(52) U.S. Cl. .................... 162/175; 162/158; 162/164.6; 162/168.2; 162/181.3; 162/183; 106/31.39; 106/206.1
(58) Field of Search ................................ 162/147, 175, 162/183, 168.2, 158, 181.3, 135; 536/108, 107, 110, 118, 123; 106/31.39, 649, 206.1

(56) References Cited

U.S. PATENT DOCUMENTS

| | | |
|---|---|---|
| 2,461,139 A | 2/1949 | Caldwell |
| 2,668,156 A | 2/1954 | Calwell et al. |
| 2,825,727 A | 3/1958 | Caldwell |
| 4,379,919 A | 4/1983 | Tessler et al. |
| 4,387,221 A | 6/1983 | Tessler et al. |
| 4,872,951 A * | 10/1989 | Maliczyszyn et al. ...... 162/135 |
| 5,129,989 A * | 7/1992 | Gosset et al. ............... 162/147 |
| 6,413,372 B1 * | 7/2002 | Maliczyszyn et al. ...... 162/175 |

FOREIGN PATENT DOCUMENTS

| | | |
|---|---|---|
| EP | 0 041 056 | 12/1981 |
| EP | 0 257 338 | 3/1988 |
| EP | 0 348 366 | 12/1989 |
| EP | 0 490 425 | 6/1992 |
| GB | 1 511 857 | 5/1978 |

OTHER PUBLICATIONS

Derwent abstract of PCT WO9902597.
Derwent abstract of JP 05 230 792.
Derwent abstract of JP 08 296 193.

* cited by examiner

*Primary Examiner*—Mark Halpern
(74) *Attorney, Agent, or Firm*—Sturm & Fix LLP

(57) ABSTRACT

This invention relates to a novel composition for the production of planar structures, whereby said composition is based on a cationic amylaceous material and a sulphonated amylaceous such as sulphocarboxylate. The composition can exist in the form of a pulverulent solid mixture or an aqueous suspension in which both amylaceous materials take the form of granules which are swollen or unswollen. Said composition can also exist in the form of an adhesive which can or cannot contain granular structures which are swollen or unswollen and/or complexes which associate both amylaceous materials. Said complexes flocculate and precipitate generally during the solubilization stage which can advantageously consist of a continuous or discontinuous curing stage. The use of said compositions and flocculated/precipitated complexes that they can contain allows planar structures, especially structures made of paper, cardboard or films, to be provided with physical characteristics that meet the needs of current usage in every way. Said compositions can be introduced into a fibrous mass either on one occasion or on a number of occasions at a rate of 2–12 wt. % (sec/sec) for internal treatment of paper.

18 Claims, No Drawings

COMPOSITION AND METHOD FOR THE PRODUCTION OF PLANAR STRUCTURES, ESPECIALLY STRUCTURES MADE OF PAPER OR CARDBOARD

This application is a 371 of PCT/FR00/01504 filed on May 31, 2000, and claims priority over application 99/07086 filed in France on Jun. 4, 1999.

The invention concerns a novel composition for producing plane structures, the term "plane structures", from now on denoting any fibrous or non-fibrous structure, either already plane or that can be made plane, having a variable composition, variable characteristics (strength, flexibility etc), dimensions and thickness.

This definition includes plane structures, in particular sheets based on recycled or non-recycled cellulose fibers (a raw material that is more frequently used in the paper and board industry) but also based, among others on:

natural fibers other than cellulose fibers such as certain textile fibers, synthetic fibers such as polyamide, polyester and polyacrylic resin fibers, inorganic fibers such as asbestos, ceramic and glass fibers, any combinations of the fibers mentioned above.

The composition according to the invention can be applied, among other materials, to papers and boards for wrapping and packaging, for example fluted and covering papers for corrugated paper, corrugated board and flexible papers of the kraft type, as well as papers for graphic use.

It is also applicable to plane structures that are generally thicker than sheets such as boards or laths based on wood, board, paper and/or inorganic fibers or films based on synthetic materials such as polyethylene as well as webs of threads of natural or synthetic origin.

The present invention also concerns a novel process for producing plane structures, in particular of paper or board, using the said composition.

The term production must be understood here to include equally well any internal or "body" treatment according to which said composition in the form of a size or otherwise, is totally or mainly distributed throughout the mass constituting the resulting plane structure, as well as any external treatment, in particular any surface treatment, sizing, laminating, or coating according to which the said composition, in the form of a size or otherwise, is totally or mainly applied or retained on at least one of the two faces of the resulting plane structure.

The internal and/or external treatment may moreover result from:

the "in body" use of the plane structure by applying, simultaneously or not, part of said composition in the form of a size and another part of said composition iii a form other than a size, or the use of said composition for surface treating papers for graphic purposes such as those intended for printing text, or the flocculation of fibers, for example ceramic fibers, within and/or on the surface of the plane structure following the use of said composition, or spraying said composition onto the surface of the plane structure, it then being possible to put the latter into contact with at least one other plane structure with a view to preparing a multilayer structure, or using said composition for stabilizing emulsions of sizing agents, for example based on products known under the abbreviations "ASA" or "AKD", or the use of said composition for preparing adhesives for corrugated board.

In the paper field, the requirements of economic profitability mean that increasingly:

pulps are used derived from recovered cellulose fibers ("RCF") and the quality of these RCFs has deteriorated by reason of the ever increasing number of recycling processes for "old papers", and there has been a systematic closure of circuits and thus the enrichment of manufacturing waters in organic or inorganic suspended or soluble matter, and in particular in anionic species, commonly called "anionic trash" which interfere with the bonding of cationic starch onto the fiber.

These phenomena result in an inescapable reduction in the efficiency of starches, in particular cationic starches, and the strength of papers, as well as in a virtually systematic increase in the need for purifying drainage water from papermaking machines or "white water".

In order to overcome these problems, it has been recommended to use amphoteric starches, namely containing at the same time cationic and anionic groups as described in patents FR 2 289 674 or EP 257 338. However, the complexity and cost of preparing these starches, their inadequate performance and their limited application potentialities, reduce their industrial value.

Techniques have also been exploited known as "dual" techniques, in which there are added successively in any order, a cationic polymer and an anionic compound of inorganic or organic origin. Such a technique, that must use a cationic starch and an anionic starch separately, is described in particular in patent EP 282 415 in the name of the Applicant. This process enables starches to be firmly bound but has the main disadvantage in practice of making it necessary to use two cooking installations, one for solubilizing the cationic starch and the other for solubilizing the anionic starch. Moreover, the total quantity of starches bound to the cellulose is not always sufficient to give the paper the desired physical properties.

In addition, the dual technique using a siliceous derivative as the anionic component (patent EP 41 056) has had to be improved over time with a view to meeting the ever more pressing requirements (technical, economic and statutory) with which the paper industries are confronted. These improvements, described for example in patents EP 349 366 and EP 490 425, generally improve the retention of fillers and fibers. They are however complex and do not always enable the physical properties of the paper to be increased or made acceptable, in particular when the paper has been produced under difficult conditions (high level of RCF and/or a very closed circuit).

This is the reason why a surface treatment is generally applied to at least one of the two faces of such a paper, with a view to increasing the proportion of native or modified starch entering into the constitution of the finished product.

However, this surface treatment operation incurs excess costs associated with the equipment and supplementary drying operation which it involves as well as a very large reduction (generally 15 to 25%) in machine speeds and therefore of their productivity.

Recently, it has been proposed in patent JP 08296193-A to use "a polyionic amphoteric starch complex" within the fibrous suspension. This process would enable boards to be prepared offering improved disintegration properties and laminating ability and this without harming the satisfactory running of paper machines. It appears however, that in order to obtain dispersible and uniform and therefore really elective complexes: 1) it is essential for the pH of the aqueous suspension of cationic and anionic starches to be adjusted to between pH 3 and 6, preferably between pH 4 and 5, by adding an inorganic or organic acid and 2) it is essential for the acidified suspension obtained in this way to be gelatinized on a continuously operating cooker. In order to prevent or reduce the flocculating properties of the complex, it is also advised to limit the degree of substitution ("DS") of the anionic starch to a value at most equal to 0.05.

As result of this, the recommended process is complicated to put into practice, in particular with a view to obtaining the desired complexes. It was thereafter found that it was possible to improve the performance of such a process while making it simpler and, in particular, without it being made compulsory to carry out the step mentioned above of adjusting the pH of the suspension of starches before cooking.

The Applicant has found in particular that by carefully selecting the nature of the anionic starchy material used in such a process, it was possible to improve still further the bonding of starches and/or the retention of fibers and fillers within the resulting plane structure as well as the physical properties of this structure. This was without it being absolutely necessary to put into practice pH and cooking conditions made necessary by the teachings of patent JP 08296193-A referred to above.

More precisely, the present invention concerns a novel composition for the production of plane structures, wherein it contains at least one cationic starchy material and at least one sulfonated starchy material.

"Starchy material" is understood to mean, within the sense of the present invention, in particular starches of natural or hybrid origin including those derived from genetic mutations or manipulations. These native starches may in particular be derived from potatoes, potatoes with a high amylopectin content (waxy potatoes), corn, wheat, corn with a high amylose content, rice, peas or manioc, cuts or fractions which may be made or obtained such as amylose, amylopectin, particle size cuts known to persons skilled in the art under the names wheat starch "A" and wheat starch "B" and any mixtures of at least any two of the products mentioned above, for example a mixture of corn starch and potato starch. These starchy materials may also consist of flours and other mixtures containing starch (es) and vegetable protein(s), the "starch" component (so being in the majority.

"Starchy material" is also understood to mean in particular the starches mentioned above that have been subjected to at least one of the operations of fluidification, in particular chemical and/or enzymatic fluidification, pregelatinization or solubilisation, in particular by heat or by chemical means. Accordingly, any starchy material, whether fluidified or not, contained in the composition according to the invention, may be in the unswollen granular state (raw starch), in the granular state with various stages of swelling (pregelatinized starch), and/or in the solubilized state.

Cationic starchy materials that can be used according to the invention may have been obtained by any of the known cationization processes in an aqueous medium, in a solvent medium or in a dry phase, provided that this process enables one or more nitrogen-containing groups of an electropositive nature to become bound to the starchy material. These nitrogen-containing groups may in particular include a tertiary or quaternary nitrogen atom. The amount of bound nitrogen contained in these cationic starchy materials may be situated within a wide range, in particular between approximately 0.1 and 3%. According to one variant of the invention, this bound nitrogen content is at least equal to 0.5%, preferably between 0.6 and 2%, these percentages being expressed by weight of nitrogen based on the dry weight of the cationic starchy material.

Anionic starchy materials selected according to the invention may have been obtained by any known processes whatsoever in one or more steps, for sulfonation and in particular for preparing sulfocarboxylated, sulfoalkoylated or sulfoalkenylated starches.

Such processes are described in patents U.S. Pat. No. 2,825,727, U.S. Pat. No. 4,379,919 and U.S. Pat. No. 4,387,221.

The carboxylic part of the sulfocarboxyl group bound in one or more locations onto the starchy material may have been generated by using any one of the saturated or unsaturated anhydrides described in these patents or in the preceding patents U.S. Pat. No. 2,461,139 or U.S. Pat. No. 2,668,156. By way of example, acetic, propionic, butyric, succinic, maleic, phthalic, glutaric, itaconic, citraconic, adipic, azelaic, crotonic or methacrylic anhydrides may be made to react.

The sulfonated part of the group may in particular have been generated by using a bisulfite, for example sodium, potassium or ammonium bisulfite.

In addition, the sulfonated group may have been generated in a single step by using, in particular, either a sulfonic acid or a sulfocarboxylic anhydride as described in patents U.S. Pat. No. 2,825,727, U.S. Pat. No. 4,379,919 and U.S. Pat. No. 4,387,221 mentioned above. A sulfocarboxyl group may in particular also carry an alkoyl or alkenyl group (patent U.S. Pat. No. 4,387,221) or a second sulfonated group (patent U.S. Pat. No. 4,379,919).

Advantageously, the sulfonated starchy material contained in the composition according to the invention is chosen from monosulfocarboxylated and disulfocarboxylated starches.

The Applicant has found that such a starch, for example a starch monosulfosuccinate, associated in a mixture with a cationic starch, enables papermaking performances to be achieved which are better than those observed under the same conditions with other anionic starches such as a non-sulfonated carboxylated starch or a phosphated starch.

The DS in sulfonated groups of the sulfonated starchy material may lie within a very wide range of values, for example between approximately 0.005 and 0.5, in particular between 0.01 and 0.3. It is possible for example to use a starch monosulfocarboxylate having a DS of between 0.02 and 0.2.

According to another variant, the composition according to the invention has a weight ratio between the cationic starchy material(s) on the one hand and the sulfonated starchy material(s) on the other hand (dry/dry) of between 10/1 and 1/10, preferably between 10/1 and 1/5, and more preferably still between 5/1 and 1/4. This ratio may for example be situated between 3/1 and 1/3.

The composition according to the invention may exclusively consist of at least one cationic starchy material and at least one sulfonated starchy material. It may contain water other than the water naturally present in any starchy material and/or at least one other component, preferably chosen from sizing agents, siliceous compounds, aluminum compounds, alkaline agents, rheology agents, surface active agents and bactericide agents.

The composition according to the invention may be in the form of a solid mixture, preferably a powdered mixture, containing at least one granular cationic starchy material and at least one granular sulfonated starchy material.

According to one variant, these granular starchy materials are each exclusively or mainly in the form of granules in the raw state, i.e. non-swollen.

According to another variant, at least one of these granular starchy materials is exclusively or mainly in the form of pregelatinized granules, i.e. in one or more stages of swelling.

The solid mixtures referred to above may be used as they are for certain applications. However, in the majority of cases and in particular when each of the starchy materials is in the raw state, these mixtures are suspended in a liquid, preferably water, with a view to preparing suspensions or "milks" having a variable dry matter ("DM") according to subsequent treatments and final applications envisaged. The DM may be less than 15% when the milk is designed to be cooked and then used as an internal treatment of the paper or by spraying. In the latter case, DMs greater than or equal to 15% can also be envisaged. The DM may be (much) higher (of the order of 20% or even 44%) when the milk is intended for the preparation of adhesives for corrugated board.

The suspensions described above may also result from mixing, among others, a cationic starch milk and a sulfonated starch milk.

As a result of this, the present invention particularly concerns a composition for the production of plane surfaces, wherein it is in the form of a solid mixture, preferably powdered, or a suspension, preferably an aqueous suspension, containing at least one granular cationic starchy material and at least one granular sulfonated starchy material.

Such liquid or solid forms may then be subjected, directly or otherwise, to at least one treatment capable of gelatinizing or solubilizing, completely or partly, the starchy materials which they contain. It may consist in particular of a cooking treatment which, contrary to the teachings of patent JP 08296193-A referred to above, may be carried out in a discontinuous cooker, for example of the "open vessel" type, as well as in a cooker of the "jet-cooker" type operating continuously.

At least partial solubilization or gelatinization of the starchy materials may also associate heat treatment with a chemical treatment, for example alkalinization of the medium by caustic soda.

The resulting compositions are in the form of starch solutions or "sizes" which may or may not contain, possibly to a major extent, granular starch structures that are in the raw state or are at any stage of swelling. Such sizes are preferably aqueous an d may have a variable DM. This may be less than or equal to 10%, for example of the order of 0.5 to 5%, when the size is intended for the internal treatment of paper, or of the order of 6 to 10% when it is intended for a simple surface treatment, i.e. in the absence of fillers or pigments. It may be largely greater than 10%, including a dry matter content situated between 20 and 60% for special treatment applications or for corrugated board.

The sizes described above may also result from mixing, among others, a size from a cationic starchy material and a size from a sulfonated starchy material. It is however preferred that these two starchy materials are put into the presence of each other no later than the solubilization operation for preparing the size, preferably before said operation.

The Applicant has in particular observed that the presence and then the simultaneous cooking of the two starchy materials within the same composition generally gives rise to the formation and then the flocculation and precipitation, at least partially, of insoluble structures that could be considered as complexes associating these two materials.

The flocculated/precipitated complexes may be recovered and possibly dried and may constitute as they are a composition according to the invention.

Surprisingly and unexpectedly and contrary to the teachings of patent JP 08296193-A, it has been found that:

on the one hand, the ionic charge and solubility of the flocculated size did not depend, or only depended to a small extent, on the initial pH of the milk subjected to cooking or the pH of the resulting size, and on the other hand, the presence of large flocculated and precipitated structures did not bring about a deterioration in the performances of the resulting size and even improved them.

According to one variant, the composition according to the invention is thus in the form of a size, preferably an aqueous size, wherein it contains non-solubilized starchy structures, in particular granular structures, whether swollen or not, and/or complexes associating the cationic starchy material and the sulfonated starchy material.

The Applicant has moreover observed that the efficiency of a composition according to the invention can be improved as soon as at least one of the cationic and sulfonated starchy materials consists of a cereal starch, in particular cornstarch.

Within the context of the invention, use may be advantageously made for example of 1) an association between a corn starch sulfosuccinate and either a cationic potato starch or a cationic mixture between a potato starch and a cationic corn starch or 2) an association between a potato starch sulfosuccinate and either a cationic corn starch or a cationic mixture as referred to above.

As a result of this, a simple and effective novel means is from now on available for producing plane structures, in particular of paper, board or films, this means being able to confer physical properties on said structures meeting the requirements of current practice and even exceeding these requirements.

This means is especially well suited in particular for the internal treatment of plane structures, particularly of paper, and permits the advantageous introduction, in one or more steps, of high levels of starchy materials within the mass constituting said structures during their formation. These levels of use are preferably situated between approximately 2% and 12%, these percentages being expressed as the total dry weight of cationic and sulfonated starchy materials based on the dry weight of the mass constituting the structure. This use within the paper may, as indicated, result from the introduction, in one or more steps, of a composition according to the invention, in particular at one or more points of the paper machine.

The present invention will be described in an even more detailed manner with the aid of the following examples that are in no way limiting.

EXAMPLE 1

Within the context of this example, representing difficult conditions for preparing paper (pulp based on 100% old papers), a study was made of the value of compositions according to the invention for the internal treatment of paper, i.e. as "body" additives.

One of the compositions according to the invention was initially in the form of a solid powdered mixture consisting of 75% by weight of a cationic potato starch having a bound nitrogen content of approximately 0.6%, and 25% by weight of a sulfosuccinylated potato starch with a DS of approximately 0.045.

This mixture in the crude state was suspended in water so as to obtain a milk with a DM of 10% that also constituted a composition according to the invention.

This milk, which contained complexes associating the two starchy materials, was immediately heat treated continuously in a cooking apparatus for 1 minute at 120° C. The size obtained, which contained flocculated and precipitated complexes, was diluted in-line so that the final DM was adjusted to 1%.

The resulting diluted size according to the invention, afterwards referred to as "COMPOSITION A", was then tested as a body additive within a pulp based on old papers having the following characteristics:

Total concentration (g/l): 14

Total ash (450° C.) (g/l): 3.9 pH: 7.0

Hardness (° TH): 1000

Conductivity ($\mu$s/cm): 3500

Resistivity (ohm.cm): 280

Ionic charge: 2.8 ml 0.001N POLYDADMAC

Soluble matter (g/l): 3.6

Total ash (450° C.) (g/l): 2.4

DCO (mg/l): 1300

Soluble starch (g/l): 0.7

Soluble aluminum (mg/l): 1

In a first test (TEST A1), the COMPOSITION A was introduced in an amount of 4% of starchy materials, expressed in dry weight based on the dry matter content of the pulp. The contact time between COMPOSITION A and the pulp was 5 minutes.

In a second test (TEST A2) and a third test (TEST A3), respectively, the COMPOSITION A was introduced into the pulp in an amount of 6 and 8% respectively, the contact time being maintained at 5 minutes.

Similarly, the following sizes were prepared and then tested for three levels of introduction and with the contact time mentioned above:

COMPOSITION B: size not according to the invention in which the sulfosuccinylated potato starch as used in COMPOSITION A was replaced by an identical weight of non-sulfonated succinylated potato starch (DS≈0.05).

This COMPOSITION B was introduced into the pulp in an amount of 4% (TEST B1), 6% (TEST B2) or 8% (TEST B3), COMPOSITION C: size not according to the invention in which the anionic starchy material was a phosphated potato starch. This size was tested in TESTS C1, C2, and C3 as a function of the amount in which it was introduced (4, 6 and 8% respectively).

COMPOSITION D: size according to the invention, identical to COMPOSITION A except that the sulfonated starchy material was a sulfosuccinylated corn starch (DS≈0.045). This size was tested in TESTS D1, D2 and D3 as a function of the amount in which it was introduced (4, 6 and 8% respectively).

For each of COMPOSITIONS A, B, C and D and for each of the amounts in which they were introduced (4, 6 and 8%) the following parameters were measured:

the degree of bonding of starches or "AR" in %, total degree of retention or "TR" in %, internal cohesion of the sheets obtained (according to the SCOTT-BOND test) or "IC" in joules/m$^2$ (J/m$^2$).

The total retention and internal cohesion parameters were in addition measured within the context of a control test (TEST T) in which no starchy material was introduced.

The following results were obtained:

|          | AR (1%) | TR (%) | IC (J/M$^2$) |
|----------|---------|--------|--------------|
| TEST T   | —       | 87.9   | 155          |
| TEST A1* | 100     | 89.4   | 255          |
| TEST A2* | 94      | 87.9   | 331          |
| TEST A3* | 81      | 86.3   | 362          |
| TEST B1  | 96      | 87.0   | 249          |
| TEST B2  | 77      | 85.3   | 324          |
| TEST B3  | 69      | 83.2   | 355          |
| TEST C1  | 92      | 87.1   | 251          |
| TEST C2  | 69      | 85.2   | 263          |
| TEST C3  | 63      | 83.4   | 323          |
| TEST D1* | 100     | 89.0   | 246          |
| TEST D2* | 100     | 88.3   | 307          |
| TEST D3* | 97      | 84.8   | 379          |

*test according to the invention

These results showed overall that COMPOSITIONS A and D according to the invention i.e. containing a sulfonated starchy material, in this case a sulfocarboxylated starchy material, in association with a cationic starchy material, gave better performance than compositions in which the anionic starchy component was not sulfonated, but was in particular carboxylated (COMPOSITION B) or phosphated (COMPOSITION C).

It is noteworthy that the advantages provided by the compositions according to the invention (improvement of the indices AR and TR and of the internal cohesion IC) were revealed for all levels of introduction studied.

These compositions made it possible to achieve remarkably high levels of bonding of starches and of total retention, even with a difficult pulp (old papers) and at relatively high levels of introduction (6 and 8%). These compositions could thus be advantageously used to improve the physical properties, in particular the internal cohesion of papers obtained and this without risk of large losses of starchy and fibrous materials in the white water.

EXAMPLE 2

A size according to the invention (from now on referred to as COMPOSITION E) was prepared under the same conditions as those described for EXAMPLE 1 except that 1) the initial solid mixture made into a milk and then solubilized contained 50% by weight of a sulfosuccinylated corn starch (DS≈0.045) and 2) the DM of the size was 1.8% instead of 1%.

This highly flocculated size was tested on a pulp based entirely on recovered cellulose fibers and having in particular an especially high hardness (>400°TH), conductivity (>800 $\mu$s/cm), soluble matter content (>20 g/l) and DCO (>30 g/l).

Composition E was first of all evaluated for 4 levels of introduction (4, 6, 8 and 10% dry/dry) and 2 contact times (35 s and 5 min) with a view to measuring the degree of bonding of starchy materials.

The results obtained were noteworthy because in all cases a degree of bonding was obtained at least equal to 90%.

For a long contact time (5 min), this degree was 99% for a level of introduction of 4%, and was 94% for a level of introduction of 6%. For a short contact time (35 sec) this degree was in particular 95% for levels of introduction of 8% and 10%., COMPOSITION E was then evaluated with three levels of introduction (4, 6 and 8%) and a long contact time (5 min) with a view to measuring the internal cohesion (SCOTT- BOND index) as well as the bursting strength (MULLEN index according to ISO standard 2758) of the resulting paper.

The results obtained revealed, compared with a control paper with no starch size addition:

- an increase in internal cohesion from 40% (rate of introduction: 4%) to 90% (rate of introduction: 8%)
- a corresponding increase in bursting strength from 25 to 48%.

In addition, a study of the influence of COMPOSITION E on the total degree of retention gave, in the present case, results that were equal to or slightly below those observed with a pulp without an addition of starch size. These particular results were judged to be satisfactory overall taking into account in particular the nature of the pulp.

These results confirm the value of compositions according to the invention as a means for the internal treatment of paper, in particular with a view to improving the physical properties. Such compositions may in particular be effectively used under difficult conditions (pulps with 100% old papers) and for relatively high levels of use, for example between 4 and 10%.

It is thus possible to envisage dispensing with all or part of any surface treatment applied in the prior art to achieve physical properties of the same order.

Another approach consists of increasing the level of inorganic fillers in the paper at the expense of fibers (more costly raw material than fillers) and of compensating for the resulting reduction in the physical properties of the paper by a supplementary addition of starches, made possible by using the composition according to the invention.

Complementary tests using a composition according to the invention (COMPOSITION F or G) composed of:

- 50% by weight of a cationic potato starch having a level of bound nitrogen of approximately 1.2%, and
- 50% by weight, either a) of a sulfosuccinylated potato starch with a DS of approximately 0.045 (COMPOSITION F), or b) of a sulfosuccinylated corn starch with a DS of approximately 0.045 (COMPOSITION G), confirmed overall the results and conclusions of the previously described test.

In addition, each of the COMPOSITIONS F and G mentioned above were tested in the following manner:

- at a rate of 2% by weight within the mass constituting the paper sheet, and this by use in the form of a starch size, and then,
- at a rate of 2% by weight on the surface of the paper sheet that was formed but not yet pressed/dried, and this by use in the form of a flocculated starch milk with approximately 10% DM, said milk being sprayed onto the sheet by means of a spray bar.

In addition, the COMPOSITION G was tested in the following manner:

- at a rate of 1.5% by weight in a "body" application in the thick stock chest, and this in the form of a starch size, and then,
- at a rate of 1.5% by weight in the form of a flocculated and non-solubilized starch milk introduced into the diluted pulp circuit (downstream from the purifier under pressure).

These tests confirmed overall the results and conclusions of the previously described test, particularly in terms of a very significant improvement in internal cohesion and the burst index of the papers obtained.

Moreover, these tests also showed a very significant improvement (i.e. at least 20%) in the "CMT 30" values obtained on paper of the covering type for a corrugated board.

It should be recalled that the "CMT 30" index is particularly suitable for evaluating a fluted paper for corrugated board and in particular for determining the flat compression strength of such a paper.

It is also noteworthy that improvements in the "CMT 30" index were obtained on a covering paper while the paper machine on this occasion was not adjusted for the production of such a paper.

As a result of this, the use of a composition according to the invention makes it possible to envisage gains in CMT of at least 20%, and this for all types of papers for corrugated board (covering and fluted).

This is all the more surprising considering that, as the Applicant has found, such gains do not harm the other properties of such papers (porosity, wetability, etc.) nor the subsequent use of such papers in board making. Now, such harmful effects are generally encountered with papers surface treated in a "size press".

This confirms the value of compositions according to the invention within the aim of totally or partially dispensing with devices of the "size press" type.

EXAMPLE 3

Within the context of this example, the emulsifying properties were studied of a composition (COMPOSITION H) according to the invention consisting of:

- 90% by weight (dry/dry) of a cationic potato starch having a DS of approximately 0.04, and
- 10% by weight, (dry/dry) of a sulfosuccinylated potato starch having a DS of approximately 0.045.

The composition H was treated in a continuous cooking apparatus under the following conditions:

milk of COMPOSITION H with 10% DM.

cooking temperature: 120° C., cooking time: 1 minute.

Starting with this treatment, a size was prepared with 6% DM. 3 g of the sizing agent "FIBRAN 76" based on alkenylsuccinic anhydride ("ASA") was added to 100 g of said size thus containing 6 g total of starch material.

The size composition obtained, which had a weight ratio of starchy materials (dry weight)/sizing agent of 2/1, was then subjected to high shear treatment, namely homogenization for 5 minutes at 20,000 revolutions/minute.

The emulsion obtained in this way was then diluted, without stirring, with well water in a 1 liter volumetric flask so as to obtain a "FIBRAN 76" emulsion containing 0.3% sizing agent.

Observations made periodically over a period of 5 hours showed that the sizing agent emulsion obtained in this way remained perfectly stable and homogeneous.

What is claimed is:

1. A process for the internal treatment of plane structures, wherein the plane structures are paper, board or films, said process comprising the simultaneous introduction of a composition comprising at least one cationic starchy material and at least one sulfonated starchy material so that such composition is totally or substantially distributed throughout the resulting plane structure.

2. The process as claimed in claim 1, wherein the composition is used in an amount of 2 to 12% expressed in total dry weight of cationic and sulfonated starchy materials based on the dry weight of the said structure.

3. The process as claimed in claim 1, wherein the composition is used in an amount of 4 to 10% expressed in total dry weight of cationic and sulfonated starchy materials based on the dry weight of the said structure.

4. The process as claimed in claim 1, wherein the sulfonated starchy material is selected from the group consisting of sulfocarboxylated starches, sulfoalkoylated starches and sulfoalkenylated starches.

5. The process as claimed in claim 4, wherein the sulfonated starchy material is selected from the group consisting of monosulfocarboxylated and disulfocarboxylated starches.

6. The process as claimed in claim 1, wherein the composition comprises a weight ratio of the cationic starchy material(s) to the sulfonated starchy material(s), of between 10/1 and 1/10.

7. The process as claimed in claim 1, wherein the composition comprises a weight ratio of the cationic starchy material(s) to the sulfonated starchy material(s), of between 10/1 and 1/5.

8. The process as claimed in claim 1, wherein the composition comprises a weight ratio of the cationic starchy material(s) to the sulfonated starchy material(s), of between 5/1 and 1/4.

9. The process as claimed in claim 1, wherein the composition is in the form of a solid mixture, containing at least one granular cationic starchy material and at least one granular sulfonated starchy material.

10. The process as claimed in claim 9, wherein the composition is in the form of a powdered material.

11. The process as claimed in claim 1, wherein the composition is in the form of a suspension, containing at least one granular cationic starchy material and at least one granular sulfonated starchy material.

12. The process as claimed in claim 11, wherein the composition is in the form of an aqueous suspension.

13. The process as claimed in claim 1, wherein the composition is in the form of a size.

14. The process as claimed in claim 13, wherein the composition is in the form of an aqueous size.

15. The process as claimed in claim 14, wherein the composition comprises non-solubilized starchy structures.

16. The process as claimed in claim 15, wherein the composition comprises granular structures, whether swollen or not, and/or complexes associating the cationic starchy material with the sulfonated starchy material.

17. The process according to claim 1, wherein at least one of the cationic and sulfonated starchy materials consists of a cereal starch.

18. The process according to claim 17, wherein the cereal starch is a corn starch.

* * * * *